Sept. 7, 1937.  E. E. HEWITT  2,092,394
RETARDATION CONTROLLED BRAKE
Filed July 16, 1936  2 Sheets-Sheet 1
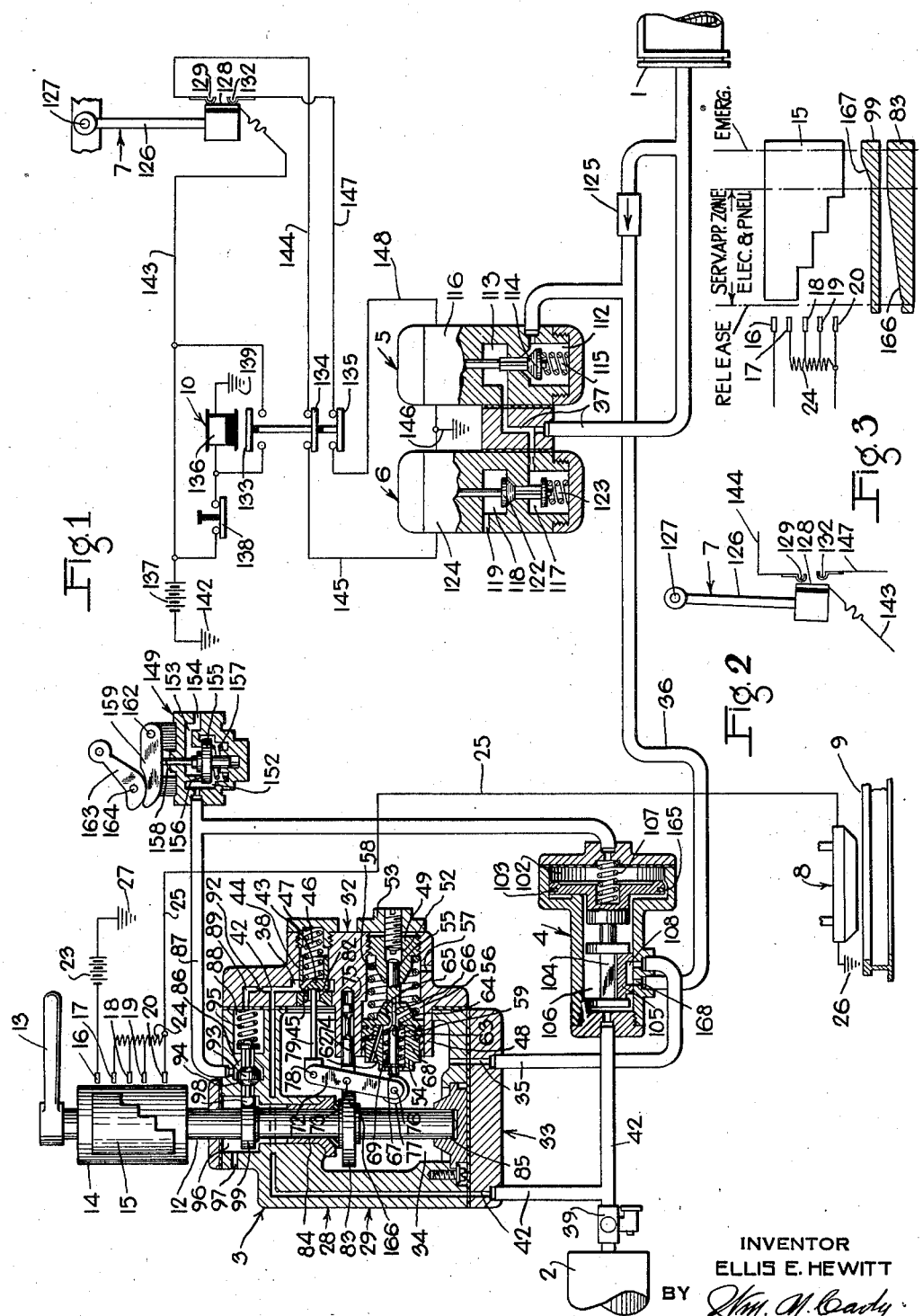
INVENTOR
ELLIS E. HEWITT
BY Wm. M. Cady
ATTORNEY Sept. 7, 1937.  E. E. HEWITT  2,092,394
RETARDATION CONTROLLED BRAKE
Filed July 16, 1936  2 Sheets-Sheet 2
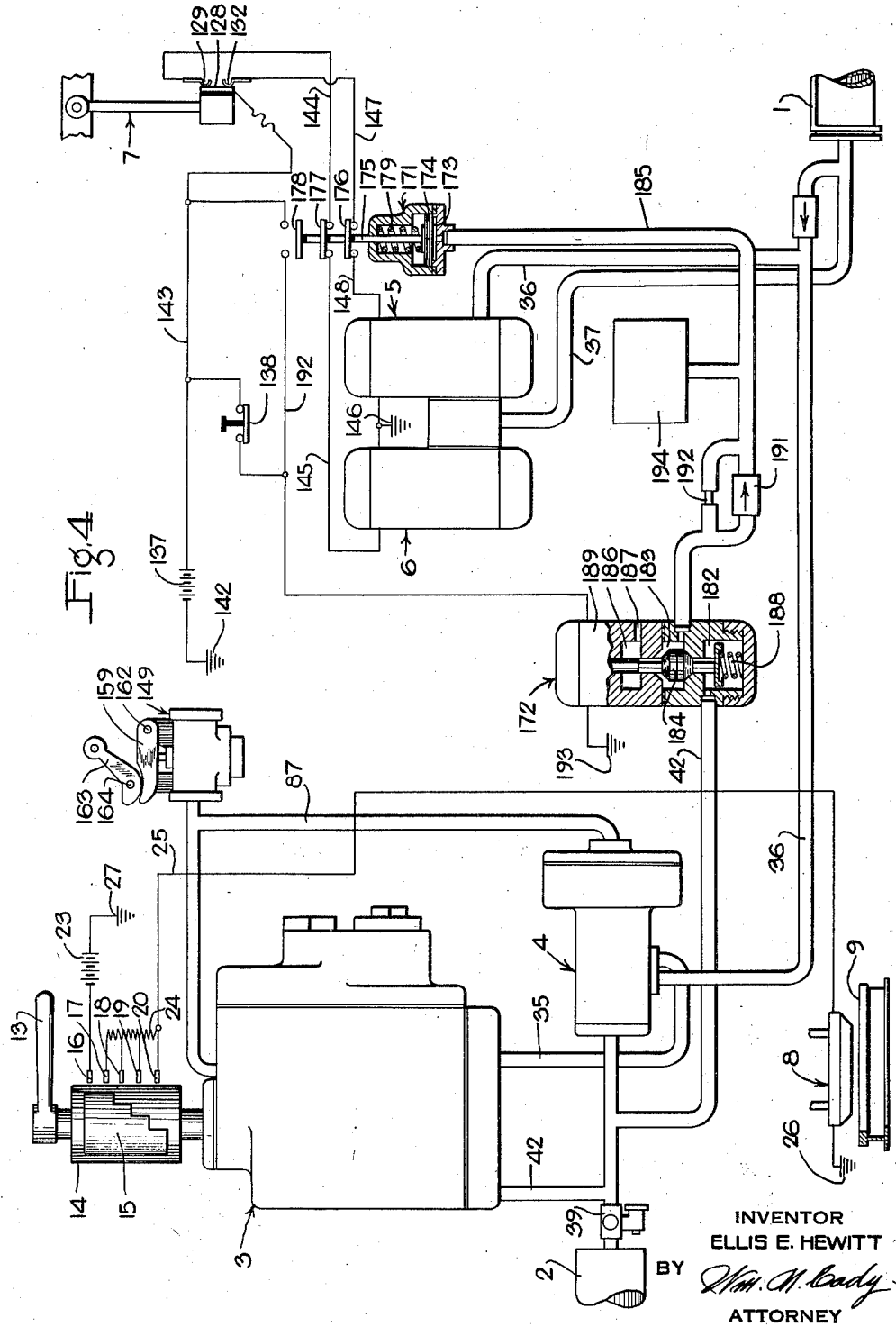
INVENTOR
ELLIS E. HEWITT
BY
ATTORNEY Patented Sept. 7, 1937

2,092,394

UNITED STATES PATENT OFFICE 2,092,394

RETARDATION CONTROLLED BRAKE

Ellis E. Hewitt, Edgewood, Pa., assignor to The Westinghouse Air Brake Company, Wilmerding, Pa., a corporation of Pennsylvania Application July 16, 1936, Serial No. 90,861

15 Claims. (Cl. 303—3)

My invention relates to retardation controlled brake equipment and particularly to such equipment wherein provision is made for modifying the degree of application of certain of a plurality of braking means from that permitted by a retardation controller device.

In vehicles employing friction type brakes it is well known that for a given braking pressure such brakes are less effective in retarding the motion of the vehicle at high speed than at low speed because of the varying coefficient of friction between the wheels and the brake shoes which is lower at high speed than at low speed.

In order to bring a vehicle to a stop quickly, employing the maximum permissible brake pressure at all speeds, it has been common practice for an operator to apply the brakes with a high degree of braking pressure at high speed, and, as the speed of the vehicle decreases, to decrease the braking pressure gradually in order to provide for a smooth stop without shock or slipping of the wheels. In order to insure a more continuous utilization of the maximum permissible braking pressure at all speeds it has become customary to employ a retardation controller device responsive to the rate of retardation of the vehicle for limiting the degree of application of the brakes to a permitted maximum value determined by the setting of the retardation controller. In those types of equipment in which the setting of the retardation controller is not under the control of the operator during a run, the retardation controller is set to limit the rate of retardation to a value slightly below that value of braking which is required to cause the wheels to slide on the rails under normal track conditions. It is possible that, with the retardation controller set to prevent wheel sliding under normal track conditions, wheel sliding may still occur under certain abnormal rail conditions. Under such abnormal conditions it is desirable to provide means for decreasing the maximum braking force below that permitted by the retardation controller in order to prevent wheel sliding.

In a brake equipment employing a plurality of braking means, such as a track brake for applying a braking force directly to the track rails, and braking means for applying a braking force to the vehicle wheels, such as, for example, as a fluid pressure brake for applying a braking pressure to the rim of the vehicle wheels, the degree of application of the brake applied through the vehicle wheel that is permitted by the retardation controller may, under some track and weather conditions, be so severe as to cause the wheels to slide on the rails.

It is an object of my invention to provide a brake equipment employing a plurality of braking means jointly controlled by a common controller mechanism in which provision is made for varying the braking force on the vehicle wheels without changing the setting of the retardation controller device.

It is a further object of my invention to provide a brake equipment of the above indicated character in which means is provided for decreasing the braking torque on the vehicle wheels without decreasing the braking force on other braking means.

Other objects and advantages of my invention will be apparent from the following description of preferred embodiments thereof, reference being had to the accompanying drawings in which, Fig. 1 is a diagrammatic view of circuits and apparatus constituting one preferred embodiment of the invention, Fig. 2 is a detailed view of the retardation controller device in its circuit interrupting position, Fig. 3 is a diagrammatic development of the control drum and cam of the brake controller device illustrated in Fig. 1, and Fig. 4 is a diagrammatic view of circuits and apparatus constituting another preferred embodiment of the invention.

Referring to the drawings, and particularly to Fig. 1 thereof, a fluid pressure brake is provided indicated by the brake cylinder 1 that is supplied with fluid under pressure from a main reservoir 2 and controlled by a brake controller device 3 and an automatic valve device 4, and by admission and release magnet valve devices 5 and 6 that are controlled by a retardation controller device 7 in accordance with the rate of deceleration of the vehicle. A track brake is also provided as indicated by the magnetic track shoe 8 that is adapted to engage the track rail 9 that is also under the control of the manually operable controller device 3.

The manually operable controller 3 comprises a shaft 12 that is actuated by a lever 13 and is provided on its upper portion with a control drum 14 having a conducting segment 15 that is adapted to engage the contact members 16, 17, 18, 19 and 20 for controlling the energization of the magnetic track shoe 8 from the battery 23 through conductor 25 and the grounded terminals 26 and 27 of the battery 23.

The lower end of the shaft 12 extends within a self-lapping brake valve device 28 of the controller 3 that may correspond substantially with that disclosed and claimed in the copending U. S. Patent application of Ewing K. Lynn and Rankin J. Bush for improvements in Brake valve devices, Serial No. 569,158, filed October 16, 1931, and assigned to the same assignee as this application.

The device 28 comprises a main body portion 29, a self-lapping portion 32 and a bottom or bracket portion 33, the three portions together defining a pressure chamber 34 that is in communication with the brake cylinder 1 through passage and pipe 35, the automatic valve device 4, the straight air pipe 36 and the admission magnet valve device 5 and brake cylinder pipe 37.

The self-lapping valve portion 32 is provided with a supply valve chamber 38 to which a feed valve device 39 of the usual type supplies fluid under pressure at a reduced pressure from the main reservoir 2 through main reservoir pipe and passage 42. A supply valve 43 is contained within the supply valve chamber 38 and is slidably disposed within a bore 44 in the casing to engage a seat 45 provided in the valve portion of the casing. The supply valve 43 is subject to the pressure of a spring 46 one end of which engages the valve and the other end of which engages a nut 47 screw-threadedly attached within a bore in the self-lapping valve portion of the casing.

The self-lapping valve portion 32 is also provided with a cylinder 48 which is open at one end to the pressure chamber 34, the other end of the cylinder being closed by an adjusting member 49 screw-threadedly attached within a bore in the self-lapping valve casing portion. The adjusting member 49 is provided with a central bore 52 which at its outer end is adapted to receive a screw-threaded cap member 53.

Operatively mounted in the cylinder 48 adjacent its open end is a movable abutment in the form of a piston 54 having a stem 55 which is slidably guided by the adjusting member 49 within the inner end of the bore 52. At one end of the piston 54 is a chamber 56 which is constantly open to the atmosphere through the exhaust port 57. A coil spring 58 is contained in the chamber 56 and is interposed between and engaging the inner face of the piston 54 and the inner face of the adjusting member 49.

A release valve chamber 59 is provided within the piston 54 that is in open communication with the pressure chamber 34 through a passage 62. A release valve 63 is contained within the valve chamber 59 and is adapted to seat on the valve seat 64 formed on the piston and which is operative to control communication between the valve chamber 59 and the chamber 56 through connecting passages 65 in the piston stem 54. The release valve is provided with a stem 66, the small end of which slides within a bore in the stem of the piston 54 and the larger end of which is provided with a collar 67 which slidably engages the piston within a central bore 68 and is subject to the pressure of the release valve spring 69 interposed between the collar 67 and the end of the release valve chamber 59. Outward movement of the release valve relative to the piston 54 is limited by the collar 67 which engages a stop flange that is secured to the piston 54.

A mechanism is provided for controlling the operation of the supply valve 43 and the release valve 63 comprising spaced levers 72 that are pivotally mounted intermediate their ends on a pin 73 supported in a plunger 74 that is slidably guided within a bore 75 in the casing of the self-lapping valve portion 32.

The lower end of the spaced levers 72 are connected together by a pin 76 which is loosely mounted within a roller 77 that is adapted to operatively engage the outer end of the release valve stem 66. The upper ends of the spaced levers 72 are connected together by a pin 78 on which one end of the operating rod 79 is pivotally mounted, the opposite end of the rod 79 operatively engaging the supply valve 43 within a recess 82 formed in its face.

For the purpose of operating the plunger 74 toward the right is provided an operating cam 83 mounted upon the shaft 12 that is carried in an upper bearing 84 and in a lower bearing 85 and is arranged to be operated by the brake valve handle 13. As the handle 13 is moved progressively from its release position toward a full service application position the cam 83 forces the plunger 74 progressively towards the right.

It will be appreciated that the force of the release valve spring 69 is less than the force of the supply valve spring 46 which is less than the force of the regulating spring 58. When the cam 83 and the plunger 74 are in their release positions as indicated in Fig. 1 of the drawings, the spring 46 forces the supply valve 43 toward the left to its seated position and the spring 69 forces the release valve 63 toward the left to its unseated position.

An emergency valve chamber 86 is provided in the upper part of the body portion of the casing 28 that is in constant open communication with the control pipe 87 and through chamber 88, passage 89 and choke 92 with the main reservoir passage 42 so as to be normally charged at main reservoir pipe pressure. An emergency valve 93 is provided within the valve chamber 86 and is normally urged to its seat 94 by a spring 95 within the chamber 88 to close communication between the emergency valve chamber 86 and the atmosphere through chamber 96 and exhaust port 97. The valve 93 is provided with a stem 98 extending through a bore in the casing into the chamber 96 and adapted to engage the surface of a cam 99 therein that is integral with the shaft 12 passing therethrough.

The automatic valve device 4 comprises a casing providing a piston chamber 102 that is in constant communication with the control pipe 87 having a stem 104 that is operatively connected to a slide valve 105 within a slide valve chamber 106 within the casing. A spring 107 is provided within the piston chamber 102, one end of which engages the end wall of the casing and the other end of which engages within a cavity in the piston 103 for normally forcing the piston and slide valve 105 toward the left to their illustrated positions to effect communication through cavity 108 in the slide valve 105 between the pressure chamber 34 and the straight air pipe 76.

The admission magnet valve device 5 comprises a casing containing an admission valve chamber 112 that is constantly in open communication with the straight air pipe 36 and a chamber 113 that is in constant open communication with the brake cylinder 1 through brake cylinder passage and pipe 37. The chamber 112 contains an admission valve 114 that is urged upwardly to its seat by a spring 115 and downwardly from its seat by a magnet 116 in the upper part of the casing.

The release magnet valve device 6 comprises a casing containing a chamber 117 that is in constant communication with the brake cylinder 1 through brake cylinder passage and pipe 37 and an exhaust chamber 118 that is in constant communication with the atmosphere through an exhaust port 119, and which contains a release valve 122 that is urged upwardly from its seat by a spring 123 within the chamber 117 and downwardly from its seat by a magnet 124 in the upper part of the casing.

The retardation controller device 7 comprises an inertia pendulum 126 that is pivotally mounted on a pin 127 and carries a contact member 128 that is adapted to engage the contact members 129 and 132 to control the energization of the release and application magnet valve devices 6 and 5, respectively.

The relay 10 comprises contact members 133, 134 and 135 that are normally maintained in their upper or illustrated positions by the energization of a relay winding 136, which is designed to have a slow pick-up characteristic. The relay winding is energized through a circuit extending from the positive terminal of the battery 137 through the manually operable push button switch 138, the winding 136, to ground at 139, and to the grounded terminal 142 of the battery 137.

With the relay 10 energized and the retardation controller 7 in its illustrated position circuits are completed from the battery 137 for energizing the release and application magnet valve devices 6 and 5 extending from the positive terminal of the battery 137 through conductor 143 to the contact member 128 of the retardation controller pendulum 126, one of these circuits continuing from the conductor 128 through contact member 129, conductor 144, relay contact member 134, conductor 145, the winding of the magnet 124 of the release magnet valve device 6 to ground at 146, and to the grounded terminal 142 of the battery 137. The circuit for energizing the winding of the admission magnet valve device 5 continues from the contact member 128 of the retardation controller, through contact member 132, conductor 147, relay contact member 135, conductor 148, the winding of the magnet valve 116 of the admission magnet valve device 5, to ground at 146, and to the grounded terminal 142 of the battery 137.

The conductor's valve 149 is provided having a chamber 152 that is in constant open communication with the control pipe 87 and a chamber 153 that is in open communication with the atmosphere through an exhaust port 154. A valve 155 is provided within the chamber 152 and is normally urged to a rib seat 156 by a spring 157 provided within the chamber to close communication between the control pipe and the atmosphere. A stem 158 extends upwardly from the valve 155 and is adapted to engage a lever 159 that is pivotally supported on a pin 162 provided in a bracket extending upwardly from the valve casing. An operating lever 163 is provided that is pivotally mounted on a pin 164 on a bracket extending upwardly from the casing and that is adapted upon movement in either direction from its illustrated position to force the lever 159 downwardly against the stem 158 to force the valve 155 from its seat to effect communication from the control pipe 87 to the atmosphere through the exhaust port 154.

*Charging the system*

The system is charged upon the flow of fluid under pressure from the main reservoir 2 to the main reservoir pipe 42 as supplied at a reduced pressure by the feed valve 39. From the main reservoir pipe 42 fluid under pressure flows to charge the supply valve chamber 38 in the self-lapping valve device 3 and through the restricted choke 92, chambers 88 and 86 to the control pipe 87. The control pipe 87 may also be charged by the flow of fluid under pressure from the main reservoir pipe 42 to the slide valve chamber 106 of the automatic valve device 4 and through feed groove 165 to the piston chamber 102 that is in constant open communication with the control pipe 87.

*Operation*

If the operator wishes to make a service application of the brakes, the handle 13 of the brake controller device 3 is moved from its release position an amount dependent upon the desired degree of application of the brakes. Upon the initial movement of the brake valve handle 13 from its release position the conducting segment 15 of the controller drum 14 closes a circuit from the battery 23 through contact members 16 and 17, the resistor 24, conductor 25, the winding of the track shoe 8 to ground at 26, and to the grounded terminal 27 of the battery 23. Upon further movement of the handle 13 from its release position one or more of the contact members 18, 19 and 20 will engage the conducting segment 15 and cut out increasing portions of the resistor 24 from the circuit of the track brake shoe 8 thus increasing the energization of the track shoe.

Also upon the initial movement of the handle 13 from its release position the sloping surface 166 of the cam 83 (Figs. 1 and 3) moves against the plunger 74 forcing the plunger 74 toward the right. The first part of this movement effects a compression of the release valve spring 69 and forces the release valve 63 to its seat closing communication from the pressure chamber 34 to the atmosphere through passages 62 and 65 and the exhaust port 57. Further movement of the roller 77 is prevented by the stiffness of the regulating spring 58, thus causing the rod 79 to force the supply valve 43 against the compression of the supply valve spring 46 to open communication between the main reservoir pipe 42 and the pressure chamber 34 through supply valve chamber 38, thus supplying fluid under pressure to the brake cylinder 1 through pressure chamber 34, passage and pipe 35, the cavity 108 in the slide valve 105, straight air pipe 37, chambers 112 and 113 of the admission magnet valve device 5 and brake cylinder passage and pipe 37.

The pressure established in the pressure chamber 34 of the brake valve device and in the piston chamber 1 is dependent upon the amount of movement of the operating handle 13 from its release position. When the pressure within the chamber 34 increases due to the flow of fluid thereto through the supply valve chambers 38, a like pressure is exerted on the chamber side of the piston 54 in opposition to the pressure exerted by the regulating spring 58. This pressure continues to build up until it becomes sufficient to force the piston 54 toward the right, thus relieving the pressure on the roller 77 and permitting the supply valve spring 46 to force the rod 79 toward the left pivoting the lever 72 about the pivot 73 and moving the supply valve 43 into engagement with its seat 45. The amount of pressure on the chamber side of the piston 54 necessary to effect sufficient movement of the piston 54 to cause the supply valve 43 to seat is dependent upon the amount of movement of the operating lever 13 and of the plunger 74 from their release positions.

The greater the movement of the operating lever 13 from its release position the greater will be the amount of movement of the pivot pin 73 toward the right, and, consequently, the greater will be the compression of the regulating spring 58 necessary to permit movement of the lever 72 and of the rod 79 to effect the seating of the supply valve 43. It will be apparent therefore that the brake valve device is self-lapping on a pressure basis, the degree of fluid pressure within the pressure chamber 34 necessary to effect the movement of the valve to lap position being dependent upon the amount of movement of the operating lever 13 from its release position.

If after the brakes have been applied the rate of retardation of the vehicle is sufficient to cause the inertia body 126 of the retardation controller device 7 to be moved toward the left the contact member 128 thereof will be separated from the contact member 132 thus interrupting the above traced circuit through the winding of the magnet 116 in the upper part of the casing of the admission magnet valve device 5, thus deenergizing this magnet and permitting the admission valve 114 to be forced to its seat by the spring 115 to close communication from the straight air pipe 36 to the brake cylinder 1, thus preventing a further increase in the degree of application of the fluid pressure brake.

It will be noted by reference to Fig. 2 that, upon movement of the pendulum 126 toward the left, the contact members 128 will separate from the contact member 132 prior to its separation from the contact member 129. If the rate of retardation of the vehicle is sufficient to move the pendulum 126 toward the left to separate the contact members 128 and 129 the circuit through the winding of the magnet 124 of the release magnet valve device 6 will be interrupted, thus permitting the spring 123 to force the release valve 122 upwardly from its seat and permit the release of fluid under pressure from the brake cylinder to the atmosphere through chambers 117, 118 and the exhaust port 119.

In order to permit the operator to make as high degree of application of the brakes as is permissible with good track conditions, the retardation controller 7 is usually set so that the rate of retardation of the vehicle requires separation of the contact member 128 from the contact members 132 and 129 will be only slightly below that value of retardation which would cause slipping of the wheels on the rails under normal track conditions. If the track conditions are abnormal such as would be the case if the rails are covered with ice and snow, the operator may desire to limit the degree of application of the fluid pressure brakes below that value permitted by the retardation controller, in order to prevent slipping of the wheels, which, under such rail conditions, will occur at a lower rate of retardation.

Under such conditions the operator may press the push button switch 138 to a circuit interrupting position, thus deenergizing the winding 136 on the relay 10 at a lower rate of retardation than that necessary to effect deenergization of the windings of the magnets of the release and application magnet valve devices 6 and 5, respectively, by the retardation controller, thus causing the several relay contact members 133, 134 and 135 to drop to their lower positions. The circuits through the windings of the magnets 124 and 116 of the relay and application magnet valve devices 6 and 5, respectively, are thus interrupted by the relay contact members 134 and 135, respectively. At the same time the relay contact member 133 completes a circuit from the positive terminal of the battery 137 through conductor 143, relay contact member 133, the winding 136 of the relay 10 to ground at 139, and to the grounded terminal 142 of the battery 137, thus energizing the winding 136 of the relay 10. Due to the slow pick-up characteristic of the winding 136 the contact members 133, 134 and 135 will not, be immediately actuated, upon the reenergization of the winding 136, but will, after a short time interval, be actuated to their upper or illustrated positions, thus again establishing the circuits through the windings of the release and application magnet valve devices to force the release valve 122 to its seat and the admission valve 114 downwardly from its seat.

Should the operator maintain the push button switch 138 in its circuit interrupting position the relay 7 will again be deenergized and the contact members 133, 134 and 135 thereof again dropped to their lower positions to again interrupt the energization of the release and application magnet valve devices 6 and 5, respectively, to effect a further reduction in brake cylinder pressure. The amount of reduction in brake cylinder pressure will be determined by the length of time the operator maintains the push button switch 138 in its circuit interrupting position to effect a step by step release in brake cylinder pressure. It will be noted that this reduction in brake cylinder pressure does not affect the energization of the track shoe brake 2 the degree of energization of which is determined by the position of the brake controller handle 13.

If the operator wishes to release the brakes, the handle 13 is moved to release position thus moving the drum 14 to a position to separate the conducting segment 115 from engagement with the contact members 16 to 20 to interrupt the circuits through the winding of the track shoe 2 and release the track shoe brake means. Upon movement of the handle 13 to release position the cam 83 is moved out of engagement with the plunger 74 permitting the release valve spring 69 acting against the release valve stem 66 to force the roller 77 and the space lever 72 toward the left to unseat the release valve 63 and permit the flow of fluid under pressure from the pressure chamber 34 to the atmosphere through the passages 62, 65 and exhaust port 57. Fluid under pressure will thus be released from the brake cylinder 1 to the atmosphere either through brake cylinder pipe 37 and chambers 113 and 112 on the admission magnet valve device 5 to the straight air pipe 36 or directly from the brake cylinder pipe 37 through the check valves 125 through straight air pipe 36 and thence through the cavity 108 in the slide valve 105 of the automatic valve device 4 to the pressure chamber 34 and to the atmosphere as above indicated.

It will be noted that the check valve 125 permits the flow of fluid under pressure in one direction only from the brake cylinder pipe 37 to the straight air pipe 36, thus preventing the supply of fluid under pressure through the brake cylinder if the admission valve 14 is seated while permitting the release of fluid under pressure from the brake cylinder 1 under control of the self-lapping valve device 28 at all times.

If the operator wishes to make an emergency application of the brakes the handle 13 is moved from release position through the service application zone to its emergency position as indicated in Fig. 3, thus causing the surface 167 (see Fig. 3) to engage the stem 98 of the emergency valve 94 and force it from its seat against the bias of the spring 95 to permit the release of fluid under pressure from the control pipe 87 to the atmosphere through emergency valve chamber 96 and exhaust port 97, to permit a rapid reduction in pressure in the control pipe 87.

Upon the reduction in control pipe pressure the pressure in the piston chamber 102 of the automatic valve device 4 is correspondingly reduced, thus causing the piston 103 to be moved toward the right against the bias of the spring 107 to effect movement of the slide valve 105 toward the right sufficiently to uncover the port 168 in the slide valve seat to effect communication from the main reservoir pipe 42 through valve chamber 106, port 168, straight air pipe 36, chambers 112 and 113 of the admission magnet valve device 5, and through passage and pipe 37 to the brake cylinder 1, thus effecting the supply of fluid under pressure to the brake cylinder independently of the build up of fluid pressure in the pressure chamber 34 of the self-lapping valve.

Automatic application of the brakes may also be effected by operation of the conductor's valve 149 by movement of the lever 163 in either direction from its illustrated position to force the lever 179 downwardly against the valve stem 156 and unseat the valve 155 to permit the release of fluid under pressure from the control pipe 87 through chambers 152, 153 and exhaust port 154 to cause the operation of the automatic valve device 4 in the manner just described.

The equipment illustrated in Fig. 4 employs the manually operable brake controller 3, the automatic valve device 4, the admission and release magnet valve devices 5 and 6, respectively, and the retardation controller 7 to control the application and release of the brakes in the same manner as described above with respect to the equipment illustrated in Fig. 1. The equipment illustrated in Fig. 4 differs however from that illustrated in Fig. 1 with respect to the apparatus controlled by the push button switch 138, which, in place of the relay 10 of Fig. 1, employs a pressure operated switch device 171 controlled by a magnet valve device 172. The pressure operated switch 171 comprises a casing providing a piston chamber 173 containing a piston 174 having a stem 175 extending outwardly of the casing and providing contact members 176, 177 and 178 that are normally urged downwardly to their illustrated positions by the spring 179 provided about the stem 175 within the casing. The contact members 176 and 177 are substituted for the relay contact members 135 and 134 respectively of Fig. 1 between the retardation controller and the admission and release magnet valve devices 5 and 6 respectively.

The magnet valve device 172 comprises a casing providing a chamber 182 that is in constant communication with the main reservoir pipe 42, a valve chamber 183 that is in constant communication with the piston chamber 173 of the pressure operated switch device 171 through pipe 185 and which contains the double beat valve 184 and a chamber 186 that is in constant communication with the atmosphere through exhaust port 187. The double beat valve 184 is provided with a stem that extends downwardly into the chamber 182 and is engaged by one end of a spring 188 provided within the chamber for urging the valve upwardly from its lower seated position and is provided with an upwardly extending stem that is actuated by a magnet 189 in the upper part of the casing to urge the valve downwardly against the bias of the spring 188 to its lower seated position. A one way check valve 191 is provided between the valve chamber 183 and the piston chamber 173 of the pressure operated switch device 171 for permitting a rapid flow of fluid under pressure to the piston chamber. A choke 192 is connected in parallel with the check valve 191 for permitting a gradual flow of fluid under pressure from the piston chamber 173 to the atmosphere when the double beat valve 184 is in its lower or illustrated position.

With the push button switch 138 in its normal or circuit closing position a circuit is closed from the positive terminal of the battery 137 through conductor 143, the push button switch 138, conductor 192, the winding of the magnet 189 in the upper portion of the magnet valve device 172, to ground at 193, and to the grounded terminal 142 of the battery 137 to maintain the magnet 189 energized and the double beat valve 184 in its lower seated or illustrated position. In this position of the valve 184, communication between the main reservoir pipe 42 and the piston chamber 173 is closed and the piston chamber 174 is in communication with the atmosphere through chambers 183, 186 and exhaust port 187, thus permitting the piston 174 and the switch contact members 176, 177 and 178 to be maintained in their lower positions by the spring 179.

If the operator wishes to effect the release of fluid under pressure from the brake cylinder 1 while the brake controlling handle 13 is in a brake applying position, and prior to the limiting of the degree of application of the fluid pressure brakes by the retardation controller device 7, the push button switch 138 is pressed thus interrupting the circuit through the winding of the magnet 189 of the magnet valve device 172 and permitting the spring 188 to force the double beat valve 184 to its upper seated position to close communication from the piston chamber 173 of the pressure operated switch device to the atmosphere through exhaust port 187, and to effect communication from the main reservoir pipe 42 to the piston chamber 173 and to a volume reservoir 194, thus forcing the piston 174 and the contact members 176, 177 and 178 upwardly, thus interrupting the circuit through the windings of the magnets of the admission and release application magnet valve devices 5 and 6, respectively, to effect a reduction in brake cylinder pressure as described above with respect to the equipment illustrated in Fig. 1.

Upon upward movement of the contact member 178 to its circuit closing position, a circuit is closed from conductor 143, through contact member 178, and conductor 192 in parallel with the circuit interrupted by the push button switch 138, thus again energizing the winding of the magnet valve device 172 and forcing the double beat valve 184 downwardly to its lower or illustrated position to close communication from the main reservoir pipe 42 to the piston chamber 173 and to effect communication therefrom to the atmosphere through exhaust port 187. The check valve 191 will prevent the release of fluid from the piston chamber 173 to the atmosphere therethrough, and the choke 192 will effect a retarded release of fluid under pressure from the piston chamber 173 to maintain the switch contact members 178, 177 and 176 in their upper positions for a short interval of time, thus preventing immediate deenergization of the release and admission magnet valve devices 6 and 5 respectively. After a short interval of time, however, the release of fluid under pressure from the piston chamber 173 will cause the contact members 177 and 176 to drop to their lower or illustrated positions to again energize the release and application magnet valve devices 6 and 5, respectively. This operation will reoccur to reduce brake cylinder pressure step by step so long as the push button switch 138 is maintained in its circuit interrupting position.

Many modifications may be made in the apparatus and circuits illustrating my invention without departing from the spirit thereof and I do not wish to be limited otherwise than by the scope of the appended claims.

Having now described my invention, what I claim as new and desire to secure by Letters Patent, is:

1. In a brake equipment for vehicles, a plurality of braking means, manually operable means for applying said braking means, a retardation controller device responsive to the rate of retardation of the vehicle for controlling the degree of application of one of said braking means, and manually operable means independent of said manually operable brake controlling means for decreasing the degree of application of said retardation controlled braking means below the value permitted by the retardation controller.

2. In a brake equipment for vehicles, a plurality of braking means including means for developing a braking torque on the vehicle wheels, manually operable brake controlling means for controlling the application and release of said plurality of braking means, a retardation controller device responsive to the rate of retardation of the vehicle for limiting the degree of application of the braking torque on the vehicle wheels, and manually operable means independent of said manually operable brake controlling means operable for decreasing the degree of application of the braking means for developing a braking torque on the car wheels below the value permitted by said retardation controller.

3. In a brake equipment for vehicles, in combination, braking means for developing the braking torque on the vehicle wheels, braking means for applying a braking force directly to the track rail, a manually operable controller for effecting the application and release of said several braking means, a retardation controller device responsive to the rate of retardation of the vehicle for limiting the degree of application of the braking means for developing a braking torque on the vehicle wheels, and means independent of said manually operable controller and of said retardation controller device for effecting the decrease in the braking force on one of said braking means.

4. In a brake equipment for vehicles, in combination, a plurality of braking means including means for developing the braking torque on the vehicle wheels, a manually operable controller common to said plurality of braking means for effecting substantially corresponding degrees of applications of said several braking means, a retardation controller device for controlling the degree of application of said means for developing a braking torque on the vehicle wheel to limit the rate of retardation of the vehicle to a predetermined value, and means operable independently of said manually operable controller for decreasing the braking force on said last named braking means below the value permitted by said retardation controller device.

5. In a brake equipment for vehicles, in combination, a fluid pressure braking means, a track braking means, a manually operable controller for effecting the application and release of said braking means, a retardation controller device responsive to the rate of retardation of the vehicle for limiting the degree of application of the fluid pressure braking means, and means independent of said manually operable controller and of said retardation controller device for effecting any desired decrease in the braking force of said fluid pressure braking means.

6. In a brake equipment for vehicles, in combination, a plurality of braking means including an electric track shoe and fluid pressure braking means, a manually operable controller device comprising an electric controller portion and a valve portion for jointly effecting substantially corresponding degrees of application of said two braking means, a retardation controlled device for controlling the degree of application of said fluid pressure braking means to limit the rate of retardation of the vehicle to a predetermined value, and means operable independently of said brake applying means for decreasing the braking force on said last named braking means below the value permitted by said retardation controller device.

7. In a brake equipment for vehicles, in combination, an electrically controlled track brake, a fluid pressure braking means including a brake cylinder, a manually operable controller device comprising an electric control portion and a self-lapping valve portion for controlling the degree of application of said two braking means respectively in accordance with the amount of movement of said controller device from its release position, electrical means comprising magnet valve means and a retardation controller device responsive to the rate of retardation of the vehicle for effecting the release of fluid under pressure from said brake cylinder independently of the operation of said manually operable controller to prevent wheel slipping under normal track conditions, and means for actuating said magnet valve means to effect the release of fluid under pressure from said brake cylinder independently of the operation of said retardation controller device to prevent wheel sliding under abnormal track conditions.

8. In a brake equipment for vehicles, in combination, an electrically controlled track brake means, a fluid pressure braking means including a brake cylinder, a manually operable controller device comprising an electric control portion and a self-lapping valve portion for controlling the degree of application of said two braking means in accordance with the amount of movement of said controller device from its release position, a control pipe, automatic valve means responsive to a reduction in control pipe pressure for supplying fluid under pressure to the brake cylinders to effect an application of the brakes independently of the operation of said manually operable controller, electrically controlled means comprising magnet valve means and a retardation controller device responsive to the rate of retardation of the vehicle for effecting the release of fluid under pressure from said brake cylinder independently of the operation of said manually operable controller to prevent wheel sliding under normal track conditions, and means independent of the operation of said retardation controller device for actuating said magnet valve means to effect the release of fluid under pressure from said brake cylinders to prevent wheel sliding under abnormal track conditions.

9. In a brake equipment for vehicles, in combination, an electrically controlled track brake, a fluid pressure braking means including a brake cylinder, a manually operable controller device comprising an electric control portion and a self-lapping valve portion for controlling the degree of application of said two braking means in accordance with the amount of movement of said controller device from its release position, electrical means for effecting the release of fluid under pressure from said brake cylinder independently of the operation of said manually operable control device comprising normally energized magnet valve means, the retardation controller device being responsive to the rate of retardation of the vehicle for interrupting the energization of the magnet valve means upon a predetermined rate of retardation of the vehicle to prevent wheel sliding under normal track conditions, and manually operable switch means for interrupting the energization of said magnet valve means independently of said retardation controller device to effect the release of fluid under pressure from said brake cylinder to prevent wheel sliding under abnormal track conditions.

10. In a brake equipment for vehicles, in combination, an electrically controlled track brake, a fluid pressure braking means including a brake cylinder, a manually operable controller device comprising an electric control portion and a self-lapping valve portion for controlling the degree of application of said two braking means in accordance with the amount of movement of said controller device from its release position, electrical means for effecting the release of fluid under pressure from said brake cylinder independently of the operation of said manually operable controller device comprising normally energized magnet valve means, a retardation controller device responsive to the rate of retardation of the vehicle for interrupting the energization of the magnet valve means upon a predetermined rate of retardation of the vehicle to prevent wheel sliding under normal track conditions, and means for interrupting the energization of said magnet valve means independently of said retardation controller device to effect the release of fluid under pressure from said brake cylinder to prevent wheel sliding under abnormal track conditions comprising a normally energized relay having a slow release characteristic and having contact members normally in circuit closing position in the energizing circuit for said magnet valve means, and a normally closed push button switch in the energizing circuit of said relay, said relay having a back contact effective upon movement of the relay to its circuit interrupting position to reenergize the relay independently of said push button switch.

11. In a brake equipment for vehicles, in combination, an electrically controlled track brake, a fluid pressure braking means including a brake cylinder, a manually operable controller device comprising an electric control portion and a self-lapping valve portion for controlling the degree of application of said two braking means, respectively, in accordance with the amount of movement of said brake controller device from its release position, electrical means for effecting the release of fluid under pressure from said brake cylinder independently of the operation of said manually operable controller device comprising normally energized magnet valve means, a retardation controller device responsive to the rate of retardation of the vehicle for interrupting the energization of the magnet valve means upon a predetermined rate of retardation of the vehicle to prevent wheel sliding under normal track conditions, and means for interrupting the energization of said magnet valve means independently of said retardation controller device to effect a release of fluid under pressure from said brake cylinder to prevent wheel sliding under abnormal track conditions comprising a pressure actuated switch having contact members in the energizing circuit of said magnet valve means and means for controlling the supply of fluid under pressure thereto comprising a switch controlling magnet valve device and a manually operable switch in the control circuit thereof, said manually operable switch being effective upon interruption of said energizing circuit to effect operation of said pressure operated switch to deenergize said magnet valve means and to establish an energizing circuit to cause said switch controlling magnet valve device to become energized independently of the manually operable switch, said switch controlling magnet valve device having a time delay characteristic in operating the pressure operated switch to its normal or circuit establishing position.

12. In a brake equipment for vehicles, in combination, an electrically controlled track brake, a fluid pressure braking means including a brake cylinder, a manually operable controller device comprising an electric control portion and a self-lapping valve portion for controlling the degree of application of said two braking means respectively in accordance with the amount of movement of said controller device from its release position, a normally charged pipe, and automatic valve means responsive to a reduction in pressure in the normally charged pipe for supplying fluid under pressure to said brake cylinder to effect the application of the brakes, electrically controlled means for effecting the release of fluid under pressure from said brake cylinders independently of the operation of said manually operable controller device comprising normally energized magnet valve means and a retardation controller device responsive to the rate of retardation of the vehicle for interrupting the energization of the magnet valve means upon a predetermined rate of retardation of the vehicle to prevent wheel sliding under normal track conditions, and manually operable switch means for interrupting the energization of said magnet valve means independently of said retardation controller device to effect the release of fluid under pressure from said brake cylinder to prevent wheel sliding under abnormal track conditions.

13. In a brake equipment for vehicles, in combination, an electrically controlled track brake, a fluid pressure braking means including a brake cylinder, a manually operable controller device comprising an electric control portion and a self-lapping valve portion for controlling the degree of application of said two braking means in accordance with the amount of movement of said controller device from its release position, electrically controlled means for effecting the release of fluid under pressure from said brake cylinder independently of the operation of said manually operable controller device comprising normally energized magnet valve means and a retardation controller device responsive to the rate of retardation of the vehicle for interrupting the energization of the magnet valve means upon a predetermined rate of retardation of the vehicle to prevent wheel sliding under normal track conditions, and means for interrupting the energization of said magnet valve means independently of said retardation controller device to effect the release of fluid under pressure from said brake cylinder to prevent wheel sliding under abnormal track conditions comprising an electric relay and control means therefor for effecting intermittent interruptions in the energization of said magnet valve means.

14. In a brake equipment for vehicles, in combination, an electrically controlled track brake, a fluid pressure braking means including a brake cylinder, a manually operable controller device comprising an electrically controlled portion and a self-lapping valve portion for controlling the degree of application of said two braking means in accordance with the amount of movement of said controller device from its release position, electrically controlled means for effecting the release of fluid under pressure from said brake cylinder independently of the operation of said manually operable controller device comprising normally energized magnet valve means and a retardation controller device responsive to the rate of retardation of the vehicle for interrupting the energization of the magnet valve means upon a predetermined rate of retardation of the vehicle to prevent wheel sliding under normal track conditions, and means for interrupting the energization of said magnet valve means independently of said retardation controller device to effect the release of fluid under pressure from said brake cylinder to prevent wheel sliding under abnormal track conditions comprising a pressure operated switch and control means therefor for effecting an intermittent interruption in the energization of said magnet valve means.

15. In a brake equipment for vehicles, in combination, an electrically controlled track brake, a fluid pressure braking means including a brake cylinder, a manually operable controller device comprising an electric control portion and a self-lapping valve portion for controlling the degree of application of said two braking means respectively in accordance with the amount of movement of the control device from its release position, electrically controlled means for effecting the release of fluid under pressure from said brake cylinder independently of the operation of said manually operable controller device comprising magnet valve means and a retardation controller device responsive to the rate of retardation of the vehicle for controlling the energization of the magnet valve means, and electrically operated means for controlling said magnet valve means to effect the release of fluid under pressure from said brake cylinder independently of said retardation controller device.

ELLIS E. HEWITT.